United States Patent [19]

Cohen

[11] 4,405,730
[45] Sep. 20, 1983

[54] POLYVINYL CHLORIDE SHOE SOLE COMPOSITION

[75] Inventor: Arnold Cohen, Cohasset, Mass.

[73] Assignee: Reichhold Chemicals, Incorporated, White Plains, N.Y.

[21] Appl. No.: 390,879

[22] Filed: Jun. 22, 1982

Related U.S. Application Data

[62] Division of Ser. No. 87,712, Oct. 24, 1979, Pat. No. 4,343,727.

[51] Int. Cl.³ .......................... C08L 1/02; C08L 1/08; A43B 1/14; A43B 13/04
[52] U.S. Cl. .................................... 524/35; 36/25 R; 36/30 A; 36/DIG. 2
[58] Field of Search ..................... 524/13, 14, 35, 297, 524/322; 36/25 R, 30 A, DIG. 2

[56] References Cited

U.S. PATENT DOCUMENTS

| | | | |
|---|---|---|---|
| 1,409,301 | 3/1922 | King et al. | 36/25 R |
| 2,039,529 | 5/1936 | Guinzburg | 260/750 |
| 2,572,184 | 10/1951 | Newton, Jr. | 524/35 |
| 2,638,457 | 5/1953 | Gates | 524/35 |
| 3,959,895 | 6/1976 | Lonnihg | 36/32 R |
| 4,133,795 | 1/1979 | Himes | 524/425 |
| 4,244,847 | 1/1981 | Posiviata et al. | 524/14 |
| 4,248,743 | 2/1981 | Goettler | 524/13 |
| 4,250,064 | 2/1981 | Chandler | 524/35 |

OTHER PUBLICATIONS

Chem. Abst., vol. 75: 110892y, "Effect . . . Fibrow Filler . . . Sole Rubbers", Shapirovskaya.
Chem. Abst., vol. 76: 154942q, "Aging of Leather Substitutes wth Fiber Filler", Putov.
Chem. Abst., vol. 89: 164594k, "Poly(vinylchloride) Shoe Soles", Kawakami et al.

Primary Examiner—John Kight, III
Assistant Examiner—Nathan M. Nutter

[57] ABSTRACT

This invention covers a shoe sole composition compounded from polyvinyl chloride and organic cellulosic flock, and the shoe sole product produced therefrom.

14 Claims, 1 Drawing Figure

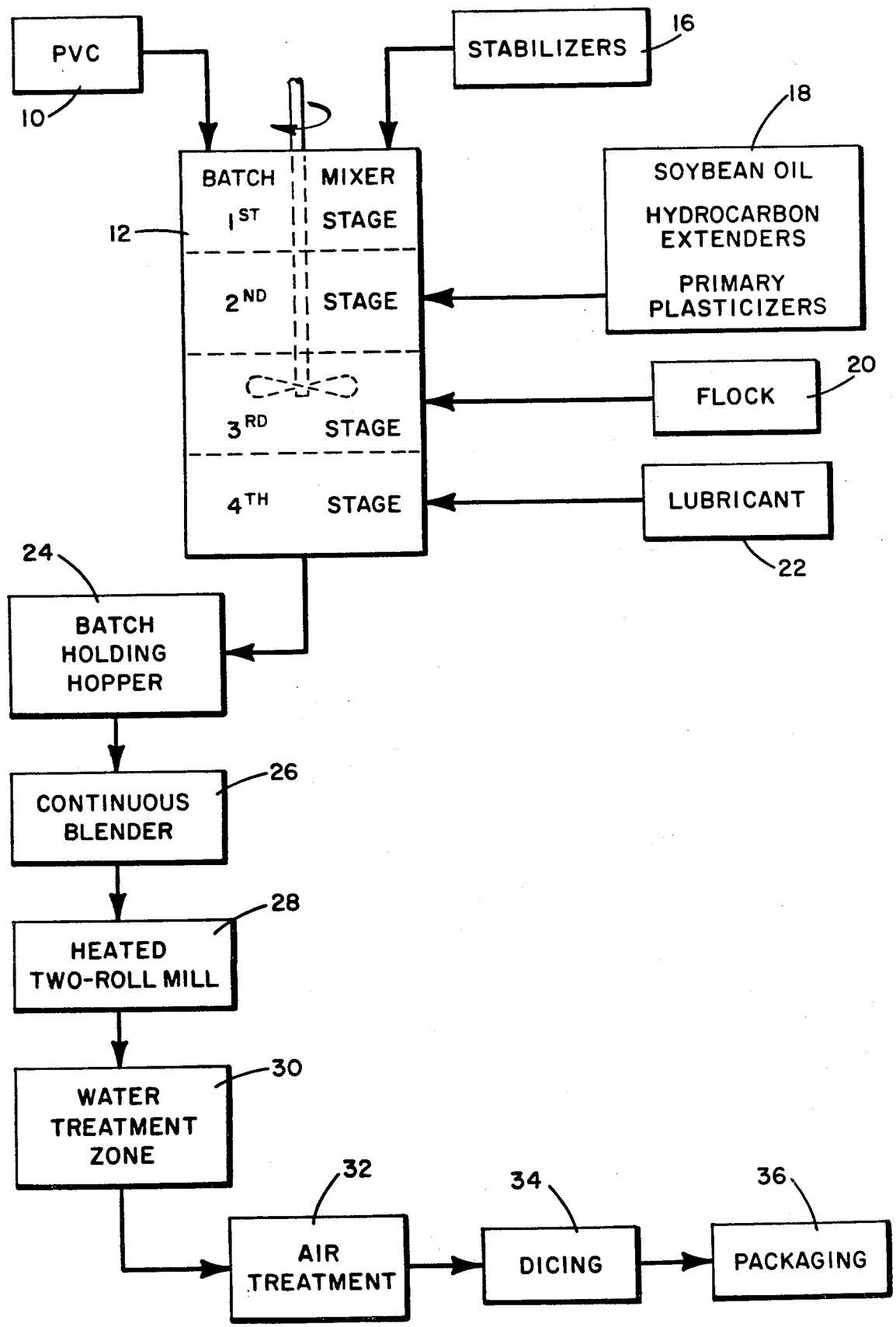

POLYVINYL CHLORIDE SHOE SOLE COMPOSITION

BACKGROUND OF THE INVENTION

This is a division of application Ser. No. 87,712 filed Oct. 24, 1979, now U.S. Pat. No. 4,343,727, which in turn relates to polyvinyl chloride moldable compositions used in producing flexible unitary shoe soles.

More particularly, it covers a polyvinyl chloride composition in which a cellulose fibrous flock has been incorporated therein to form a thermoplastic compounded molding material which, when molded into a shoe sole product, produces a shoe sole that has improved flex life, is light in weight, and has the dull appearance of crepe rubber. This dull appearance is highly desirable from a consumer acceptance standpoint since it is associated with the skid resistance and oil resistance of synthetic rubbers. Shiny soles on the other hand are thought by consumers to have just the opposite properties.

It is well known in the art that leather shoe soles have a high rate of deterioration because of the constant wetting and drying that soles are subjected to during wear. To avoid this deterioration, many synthetic plastic materials have been introduced and used to form shoe sole compositions, such as vulcanized vinyl aromatic polymers having filler and cellulose flock therein to simulate a leather shoe sole. Shoe sole compositions using a rubber base are disclosed in the U.S. Pats. to Gates No. 2,638,457 and to Guinzburg No. 2,039,529. These patents cover rubber products having dispersed therethrough textile fibers as fine as flock useful for forming thin sheets of rubber in vulcanized form from which shoe soles can be made. Also, the U.S. Pat. to Himes No. 4,133,795 is directed to compositions for forming a shoe sole that simulates crepe rubber by forming a melt blend of monoalkenyl arene/diene block copolymers, crystal grade polystyrene, a hydrocarbon extending oil, and finely divided synthetic fibers.

The U.S. Pat. to Lonning No. 3,959,895 covers a molded unitary shoe sole from a fused admixture of a polyvinyl chloride polymer and a two stage core grafted composite copolymer having a particular butadiene-styrene rubbery substrate.

It is also known in the art to use a vulcanizable polyvinyl chloride molding compound containing inorganic fillers for use in producing shoe soles, but such compositions do not have the crepe-like appearance of rubber or the lightness in weight which is important in consumer acceptance of unitary shoe sole products. Also, this type of product is devoid of ease of flexing and presents a shiny plastic-like appearance which is detrimental to its use as a unitary shoe soling material where the sole per se and the heel are molded in one piece.

SUMMARY OF THE INVENTION

The present invention overcomes the above-stated disadvantages of molding material for shoe soles by providing inexpensive polyvinyl chloride injection molding shoe sole compositions that exhibit long wear life, lightness, and greatly improved flexibility while presenting the appearance of crepe rubber. Such compositions are produced by homogeneously compounding a critical amount of a cellulosic flock material into a polyvinyl chloride resin and, after thorough mixing, forming a molding material therefrom that can be injection molded to form a unitary shoe sole.

In the present invention it has been discovered that by the incorporation of a cellulosic flock material in the compounding of polyvinyl chloride type resins, a molding composition can be formed that, when formed into pellets and injection molded, will produce a shoe sole product that exhibits improved wear life and lightness as well as a high degree of flexibility. The composition also has improved skid resistance and a dull and fuzzy appearance resembling a crepe rubber, all of which make the product highly desirable for use as a shoe soling composition in the shoe industry.

The polyvinyl chloride molding compositions can be formed into a compounded material by first feeding polyvinyl chloride from a holding hopper 10, as shown in the flow diagram, into a batch mixer or ribbon blender 12 preheated to a temperature of about 240° F. and then a charge of a barium cadmium and zinc liquid and powder is introduced from a holding hopper 16 where a first stage mixing operation is performed. After the first stage mixing is completed, epoxidized soybean oil, hydrocarbon extenders, and primary plasticizer is introduced from a holding tank 18 into the batch mixer 12, now maintained at a temperature of about 160° F., and a second stage mixing is carried forth until all ingredients have been homogeneously blended together. A third stage mixing is then performed in which the required amount of an organic cellulosic fibrous flock is fed from a supply hopper 20 into the mixer 12 and the mixing continues for about 5 minutes after which a fourth stage mixing is accomplished by adding a lubricant in the form of stearic acid from a holding tank 22 and the fourth stage mixing continues until a homogeneous blend is produced.

The compounded material is then dropped from mixer 12 into a holding hopper 24 from which it is passed into a continuous blender 26 maintained at a temperature of from about 350° to about 360° F. Further blending is accomplished by feeding the compounded material from the blender 26 on a heated two roll mill 28 that has been preheated to a temperature of from about 310° to about 315° F. where it is further blended to produce, when stripped from the rolls, a fluxed compounded material; that is, a blending of the ingredients into a fluid homogeneous mass.

The fluxed molding composition is then passed through a water cooling zone 30, an air treatment zone 32 and dicing zone 34 to form the molding material in proper shape for use in the molding operation. The diced molding material is then conveyed to a packaging station for packaging in suitable bags or drums for shipment to molders and fabricators.

It will be appreciated that the homogeneous blending of a polyvinyl chloride-cellulose flock composition material, when formed into a molding material and passed through a molding apparatus to form shoe soles, has great advantages over other types of more expensive plastic material in cost of manufacture and in providing wear life that is greater than or competitive with more expensive materials.

The improved shoe sole composition of this invention can be formed from a compounded homopolymer or copolymer of polyvinyl chloride that after compounding has blended therein from about 5 to about 30 parts of an organic fibrous material such as cellulose flock, with the preferred range of fibrous material being from about 15 to about 30 parts, each based upon 100 parts of polyvinyl chloride polymeric material used.*

*All weights are each based upon 100 parts of polyvinyl chloride polymeric material used.

It is believed that homogeneous blending of the organic fibrous flock having an average fiber length of from about 30 to about 300 microns present in the range of 5 to 30 parts produces a moldable plastic mass that has new and different performance characteristics that make it adaptable to the molding of unitary plastic shoe soles, the distributed fibers providing stratified minute sites within the plastic mass that aid in the flex strength as well as reinforcing the mass to provide greater wearability and skid resistance and a modification of the appearance of the mass to make it simulate crepe rubber. It is also believed that the cellulosic fibrous flock reduces the shining plastic look of molded polyvinyl chloride that is present when inorganic fillers are used in polyvinyl chloride compounded molding materials.

Advantageously, natural organic fibrous flock material may be used. These include cotton and rayon flock. It has been found that a flock that has a cellulosic base provides excellent molding compositions when blended into the compounded polyvinyl chloride (PVC) and when the average fiber length is from about 50 to about 60 microns. Such a material is available under the trade name Solka-Floc® from the Brown Company/Berlin-Gorham Division, New York, New York 10017.

Any homopolymer of polyvinyl chloride or substituted polyvinyl chloride or copolymer or mixtures thereof advantageously may be compounded to form the composition of this invention.

In the compounding of the polyvinyl chloride composition, stabilizers may be used that will prevent decomposition of the polyvinyl chloride when it is exposed to elevated temperature during the molding process. Such suitable stabilizers can be a blend of barium, cadmium, zinc liquids and powders. It has been found that when from about 0.5 to about 1.5 parts of a stabilizer is used, very good results are obtained in the compounding operation. It will be appreciated that many other stabilizers and stabilizer systems which prevent decomposition of the polyvinyl chloride at elevated temperatures may be used provided only that the stabilizer(s) is compatible with the other ingredients in the composition.

The composition of this invention may include suitable lubricants that are compatible with the system. It has been found that stearic acid is particularly adapted to the composition of this invention, and when present in the range of about 0.1 to about 2.0 parts, very good results were obtained in the compounding of the composition.

As for plasticization of the polyvinyl chloride, it has been found that any of the higher alcohol phthalate esters may be used as primary plasticizers such as the dioctyl, didecyl, n-decyl, n-octyl, diisooctyl phthalates, and the like and mixtures thereof. Other systems of plasticizers may be used that are compatible with the ingredients of the composition. Very go was used in the range of from about 75 to about 100 parts. The compositions of this invention may also include from about 2 to about 8 parts of an epoxidized soybean oil.

It will be appreciated that to improve the compounding secondary plasticizers may be used, such as hydrocarbon extenders which are blends and mixtures of hydrocarbon cuts, mostly naphthane in nature. Very good results are obtained when from about 5 to about 20 parts of secondary plasticizers are used. Typically plasticizer systems are used which comprise blends of the above plasticizer compounds.

Also, in the compounding, a pigment or pigment blend may be used to achieve the desired crepe shoe sole color. For example, a pigment blend to produce a brown color may include a blend of orange molybdate, chrome yellow, and carbon black. It will also be appreciated that many pigment systems may be employed depending on the color and hue desired. Although the parts per hundred PVC of pigment used may vary widely depending on the color desired, it has been found that from about 1 to about 20 parts is a range in which most of the desired color can be obtained for the compositions of this invention.

The invention will be more readily understood by reference to the accompanying specific examples which are intended as illustrative only rather than as limiting the invention to the specific details set forth therein, except as defined in the accompanying claims.

EXAMPLE I

A series of typical shoe soling compositions were made in the four-stage mixing operation shown in FIG. 1 by first mixing polyvinyl chloride resin in a mixer maintained at 240° F. with barium, cadmium, zinc liquid and barium, cadmium powder, followed by a second mixing stage in which epoxidized soya, hydrocarbon extender, and di-2-ethyl hexyl phthalate, all of which had been preheated to 160° F., were added and the mixing continued until the mixture was dry. In the third stage, to the dry mixture was added Solka-Floc BW 40 and mixed for 5 minutes; followed by a fourth stage mixing in which stearic acid was added. The composition was then dropped into a batch holding hopper from which it was fed into a continuous blender maintained at a temperature of from 350° to 360° F. After thorough blending, the composition was fed onto a two-roll heated mill for curing maintained at a temperature of from 310° to 315° F. After processing on the rolls, the cured composition was stripped from the roll in sheet form, water cooled and air dried. The sheet was then ready to be cut in strips and tested.

EXAMPLE II

Using the process set forth in Example I, three representative compositions using formulas in which the concentration of flock incorporated was varied were made and compared to a control sample in which no flock was added. The three compositions and the control are shown in Table I, all ingredients based on 100 parts of polyvinyl chloride homopolymer resin in the composition.

TABLE I

| Compositions Containing Different Amounts of Flock | | | | |
|---|---|---|---|---|
| Composition | A | B | C | Control |
| Polyvinyl chloride homopolymer resin | 100.0 | 100.0 | 100.0 | 100.0 |
| Barium cadmium zinc liquid[1] | 1.0 | 1.0 | 1.0 | 1.0 |
| Barium cadmium zinc powder[1] | 1.0 | 1.0 | 1.0 | 1.0 |
| Solka-Floc BW 40[2] | 5.0 | 15.0 | 25.0 | 0.0 |
| Stearic acid | 0.3 | 0.3 | 0.3 | 0.3 |
| Epoxidized soya[3] | 5.0 | 5.0 | 5.0 | 5.0 |
| Hydrocarbon extender[4] | 10.0 | 10.0 | 10.0 | 10.0 |

TABLE I-continued

Compositions Containing Different Amounts of Flock

| Composition | A | B | C | Control |
|---|---|---|---|---|
| Di-2-ethyl hexyl phthalate | 95.0 | 95.0 | 95.0 | 87.0 |

[1] The barium, cadmium, zinc liquid and powders are blends produced by PVC stabilizer manufacturers, i.e. Argus and Ferro. They are used to prevent decomposition of the PVC resin during exposure to elevated temperatures.
[2] Trademark for finely divided fibrous products manufactured from cellulose-Brown Company
[3] Epoxidized soybean oil
[4] Hydrocarbon extenders are blends and mixtures of hydrocarbon cuts, mostly naphthane in nature-Circosol 410 or Shellflex 212.

An evaluation of the compositions prepared in accordance with Table I is shown in Table II, giving the data obtained on conducting tests on various physical properties.

TABLE II

Evaluation of Compositions of Table I

| Composition | A | B | C | Control |
|---|---|---|---|---|
| Solka-Floc BW 40, parts/100 PVC | 5 | 15 | 25 | 0 |
| Specific gravity | 1.16 | 1.17 | 1.18 | 1.15 |
| Hardness-Shore "A", 15 sec. | 55 | 60 | 63 | 54 |
| Tensile strength, psi | 1055 | 950 | 940 | 1255 |
| 100% Modulus, psi | 485 | 510 | 520 | 500 |
| Ultimate elongation, % | 310 | 275 | 290 | 385 |
| Brittle point, °C.[1] | −39.8 | −39.2 | −34.8 | — |
| Ross Flex @ −29° C. cycles to failure | 29,600 | 28,700 | 26,800 | 9,800 |
| Abrasion resistance, vol. change gm/cc loss | 1.22 | 1.84 | 2.60 | — |
| Tear strength[2] | 101 | 104 | 113 | — |

[1] Temperature in degrees centigrade at which 50% of specimens tested will fracture- ASTM D-746
[2] Tear strength is reported in "pounds per inch"

In conducting the above tests, each composition was prepared individually, adding the appropriate amount of filler to the mix. Each composition was further mixed on a two (2) roll laboratory mill until properly mixed and sheeted off for molding. Hardness buttons, tensile sheets, Ross Flex sheets and abrasion test sheets were compression molded. All specimens were conditioned 24 hours at room temperature prior to testing. Hardness and tensile measurements were made in the usual manner. Ross Flex specimens were conditioned two (2) hours @ −20° F. prior to flexing.

In examining the physical properties of the different compositions of Table I, it was found that the flock-filled compositions showed a dramatic increase in Ross Flex over the control. Also, the flock-containing compositions provided a greatly improved appearance, giving a dull effect to the sheeted product as is found in rubber-based products. The Ross Flex property improved 2.5 times even though it was 8 Shore "A" hardness points higher than the standard. The compositions containing flock, in addition, exhibited improved low temperature flexing. The test data also show that the physical properties were affected as follows:

(1) The Shore "A" hardness increased from 2 to 17 points.
(2) The specific gravity increased from 1 to 6 points.
(3) The abrasion resistance was much greater than the control.
(4) The Ross Flex properties were improved over the control.

EXAMPLE III

Using the same process set forth in Example I, four compositions were individually compounded in which flock was incorporated in one composition and the other three compositions had other types of fillers incorporated therein, and a control composition had no flock or filler. The four test compositions and a control were compounded and are shown in Table III, all ingredients in the compositions based on 100 parts of polyvinyl chloride homopolymer resin.

TABLE III

Flock Versus Filler Compositions

| Composition | D | E | F | G | Control |
|---|---|---|---|---|---|
| Polyvinyl chloride homopolymer resin | 100.0 | 100.0 | 100.0 | 100.0 | 100.0 |
| Barium cadmium zinc liquid | 1.0 | 1.0 | 1.0 | 1.0 | 1.0 |
| Barium cadmium zinc powder | 1.0 | 1.0 | 1.0 | 1.0 | 1.0 |
| Solka-Floc BW 40 | 25.0 | — | — | — | — |
| Atomite[1] | — | 25.0 | — | — | — |
| HiSil 233[2] | — | — | 25.0 | — | — |
| OMYA BSH[3] | — | — | — | 25.0 | — |
| Stearic acid | 0.3 | 0.3 | 0.3 | 0.3 | 0.3 |
| Epoxidized soya | 5.0 | 5.0 | 5.0 | 5.0 | 5.0 |
| Hydrocarbon extender | 10.0 | 10.0 | 10.0 | 10.0 | 10.0 |
| Di-2-ethyl hexyl phthalate | 95.0 | 95.0 | 95.0 | 95.0 | 87.0 |

[1] Calcium carbonate
[2] Fumed silica
[3] Coated calcium carbonate

An evaluation of the compositions prepared in accordance with Table III is shown in Table IV giving the data obtained from conducting tests on various physical properties.

TABLE IV

Comparison of Fillers

| Composition | D | E | F | G | Control |
|---|---|---|---|---|---|
| Filler | BW-40 | Atomite | HiSil 233 | OMYA BSH | 0 |
| Parts/100 PVC | 25.0 | 25.0 | 25.0 | 25.0 | 0 |
| Specific gravity | 1.18 | 1.23 | 1.20 | 1.22 | 1.15 |
| Hardness, Shore "A", 15 sec. | 62 | 52 | 67 | 52 | 54 |
| Tensile strength, psi | 915 | 1170 | 1110 | 1280 | 1255 |
| 100% Modulus, psi | 505 | 450 | 620 | 455 | 500 |
| Ultimate elongation, % | 295 | 360 | 295 | 435 | 385 |
| Ross Flex @ −29° C., cycles to failure | 25M | 30M | 14M | 29M | 10M |
| Abrasion resistance, vol. change gm/cc | 3.1 | 2.1 | 2.5 | 1.7 | — |

From the above data, the flex life appears greater for recipe E containing Atomite; however, it is 10 points softer than BW-40 recipe D. At comparable hardness, the superior enhancement of flex properties imparted by the filler in recipe D is shown in Table IV-A below:

TABLE IV-A

| Composition | D | E | Control |
|---|---|---|---|
| Filler | BW-40 | Atomite | 0 |
| Parts/100 PVC | 25.0 | 25.0 | 0 |
| Shore "A" hardness | 52 | 52 | 52 |
| Specific gravity | 1.15 | 1.23 | 1.15 |
| Ross Flex @ −20° F., cycles to failure | 52,000 | 30,000 | 28,000 |

An examination of the data in Table IV shows that composition D containing flock had a higher hardness Shore test value, a higher Ross Flex, and higher abrasion resistance than compositions E, F, or G. It was also discovered that composition D, when injection molded using a two-station Desma molder, produced a surface similar in appearance to thermoplastic rubber-like products, that is like a dull crepe. In addition, the molded product had the dullness and fuzziness that is highly desirable in injection molded shoe soles.

EXAMPLE IV

Using composition C of Table I, a shoe sole composition of this invention was made by first charging the polyvinyl chloride homopolymer resin, barium cadmium zinc liquid, and the barium cadmium zinc solids into a ribbon blender preheated to 240° F. and mixing to form a homogeneous blend.

To the homogeneous blend was added the epoxidized soya, the hydrocarbon extender, and the di-2-ethyl hexyl phthalate, which had been preheated to 160° F., and the total mixture was mixed until dry.

To the dry mix was added the Solka-Floc BW 40 and mixing was continued for 5 minutes after which the stearic acid was added.

After the batch mixing was completed, it was dropped into a holding hopper for storage and fed into a continuous mixer as needed. The hopper was maintained at a temperature of 350° to 360° F. From the continuous mixer, the blend was fed onto a two-roll mill in which the rolls were maintained at 310° to 315° F. and where further mixing and a final curing was performed to produce a fluxed shoe sole plastic composition.

The fluxed shoe sole composition was then stripped from the mill and passed through cooling water, air dried, diced and packaged ready for shipment to injection molders.

The diced shoe sole composition was fed into a two-station Desma molding device and shoe soles were produced having an appearance and feel that was similar to a dull crepe rubber. When some of the shoe soles were tested, it was found that they exhibited in addition to good appearance, a high resistance to scuffing, and excellent skid resistance when subjected to slippery surfaces. It is believed that improved skid resistance over polyvinyl chloride shoe soling compositions not employing flock is due to the flock fibers that are present in the wear surface of the shoe soles and heels.

What is claimed is:

1. A polyvinyl chloride based shoe sole formed from a molding composition, said molding composition having as a primary feature a dull non-glossy surface appearance, consisting of a polyvinyl chloride homopolymer resin containing essentially from 5 to 30 parts of a natural organic cellulosic fibrous flock homogeneously dispersed therein having an average length of from about 30 to about 300 microns, and from about 75 to about 100 parts of plasticizer and from about 0.5 to about 1.5 parts of a stabilizer, all based upon 100 parts of polyvinyl chloride homopolymer resin.

2. The polyvinyl chloride based shoe sole according to claim 1 in which the organic cellulosic fibrous flock of the molding composition is selected from the group consisting of cotton flock and rayon flock, and mixtures thereof.

3. The polyvinyl chloride based shoe sole according to claim 2 in which the average fiber length of said flock in the molding composition is from about 50 to about 60 microns.

4. The polyvinyl chloride based shoe sole according to claim 1 in which said plasticizer in the molding composition is higher alcohol phthalates and mixtures thereof.

5. The polyvinyl chloride based shoe sole according to claim 4 in which said higher alcohol phthalate plasticizer in the molding composition is di-2-ethyl hexyl phthalate.

6. The polyvinyl chloride based shoe sole according to claim 1 in which said composition contains a lubricant.

7. The polyvinyl chloride based shoe sole according to claim 6 in which said lubricant in the composition is stearic acid.

8. The polyvinyl chloride based shoe sole according to claim 1 in which said molding composition contains from about 1 to about 20 parts of an inorganic pigment per 100 parts of polyvinyl chloride polymeric material used.

9. The polyvinyl chloride based shoe sole according to claim 8 in which said molding composition contains an inorganic pigment which includes a blend of orange molybdate, chrome yellow, and carbon black.

10. The polyvinyl chloride based shoe sole according to claim 1 in which said molding composition contains from about 5 to about 20 parts of a hydrocarbon extender per 100 parts of polyvinyl chloride polymeric material used.

11. The polyvinyl chloride based shoe sole according to claim 10 in which the hydrocarbon extender in said molding composition is a mixture of hydrocarbon cuts, mostly naphthane in nature.

12. The polyvinyl chloride based shoe sole according to claim 1 in which said molding composition contains from about 2 to about 8 parts of an epoxidized soybean oil per 100 parts of polyvinyl chloride polymeric material used.

13. The polyvinyl chloride based shoe sole according to claim 1 wherein the stabilizer in said molding composition is at least one member selected from the group consisting of barium, cadmium, and zinc liquids and powders.

14. The polyvinyl chloride based shoe sole of claim 1 in which said sole includes a unitary heel portion.

* * * * *